United States Patent
Kim et al.

(10) Patent No.: US 11,862,811 B2
(45) Date of Patent: Jan. 2, 2024

(54) SEPARATOR INCLUDING POLYETHYLENE OXIDE-CONDUCTIVE CARBON COMPOSITE LAYER ON BASE SEPARATOR, METHOD FOR MANUFACTURING THE SAME, AND LITHIUM SECONDARY BATTERY COMPRISING THE SAME

(71) Applicant: LG CHEM, LTD., Seoul (KR)

(72) Inventors: Kihyun Kim, Daejeon (KR); Seungbo Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 473 days.

(21) Appl. No.: 16/972,524

(22) PCT Filed: Apr. 28, 2020

(86) PCT No.: PCT/KR2020/005614
§ 371 (c)(1),
(2) Date: Dec. 4, 2020

(87) PCT Pub. No.: WO2020/226328
PCT Pub. Date: Nov. 12, 2020

(65) Prior Publication Data
US 2021/0273296 A1    Sep. 2, 2021

(30) Foreign Application Priority Data

May 3, 2019 (KR) .................. 10-2019-0052308
Apr. 24, 2020 (KR) .................. 10-2020-0049795

(51) Int. Cl.
*H01M 50/446* (2021.01)
*H01M 50/403* (2021.01)
(Continued)

(52) U.S. Cl.
CPC ..... *H01M 50/446* (2021.01); *H01M 10/0525* (2013.01); *H01M 50/403* (2021.01); *H01M 50/449* (2021.01); *H01M 2220/20* (2013.01)

(58) Field of Classification Search
CPC . H01M 50/446; H01M 50/403; H01M 50/449
(Continued)

(56) References Cited

U.S. PATENT DOCUMENTS

2014/0377670 A1* 12/2014 Khiterer ............... H01M 4/366
                                                    429/405
2015/0318532 A1  11/2015 Manthiram et al.
(Continued)

FOREIGN PATENT DOCUMENTS

CA       2095677 C        8/1999
CN       103247786 A      8/2013
(Continued)

OTHER PUBLICATIONS

Lin et al., Enhanced Performance of Lithium Sulfur Battery with a Reduced Graphene Oxide Coating Separator, May 2015, Journal of The Electrochemical Society, 162, A1624-A1629 (Year: 2015).*
(Continued)

*Primary Examiner* — Sean P Cullen
(74) *Attorney, Agent, or Firm* — Birch, Stewart, Kolasch & Birch, LLP (57) ABSTRACT

A functional separator capable of improving the capacity and lifetime of a battery by coating a material capable of reducing lithium polysulfide on the surface of the separator, a method for manufacturing the same, and a lithium secondary battery including the same. The functional separator includes a base separator and a polyethylene oxide-conductive carbon composite layer present on the surface of the base separator.

15 Claims, 4 Drawing Sheets

(51) Int. Cl.
*H01M 50/449* (2021.01)
*H01M 10/0525* (2010.01)

(58) Field of Classification Search
USPC .......................................... 429/144, 251, 254
See application file for complete search history.

(56) References Cited

U.S. PATENT DOCUMENTS

| | | |
|---|---|---|
| 2016/0051942 A1 | 2/2016 | Park et al. |
| 2016/0233475 A1 | 8/2016 | Son et al. |
| 2016/0354729 A1 | 12/2016 | Krishna et al. |
| 2017/0093001 A1 | 3/2017 | Kim et al. |
| 2017/0187063 A1 | 6/2017 | Pistorino et al. |
| 2018/0269453 A1 | 9/2018 | Cho et al. |
| 2019/0245203 A1 | 8/2019 | Cho et al. |
| 2020/0388809 A1 | 12/2020 | Song et al. |

FOREIGN PATENT DOCUMENTS

| | | | | |
|---|---|---|---|---|
| CN | 104393349 A | * | 3/2015 | .......... H01M 10/058 |
| CN | 105514482 A | | 4/2016 | |
| CN | 105789557 A | | 7/2016 | |
| CN | 105970605 A | * | 9/2016 | ............ H01M 2/166 |
| CN | 109244334 A | | 1/2019 | |
| CN | 109314228 A | | 2/2019 | |
| EP | 3 080 852 B1 | | 2/2018 | |
| EP | 3 678 219 A1 | | 7/2020 | |
| KR | 10-0264939 B1 | | 9/2000 | |
| KR | 10-2008-0106718 A | | 12/2008 | |
| KR | 10-1421974 B1 | | 7/2014 | |
| KR | 10-2015-0045361 A | | 4/2015 | |
| KR | 10-2015-0140823 A | | 12/2015 | |
| KR | 10-2017-0037533 A | | 4/2017 | |
| KR | 10-2018-0015798 A | | 2/2018 | |
| KR | 10-2018-0084137 A | | 7/2018 | |
| KR | 10-2018-0105431 A | | 9/2018 | |
| WO | WO 2015/088451 A1 | | 6/2015 | |
| WO | WO 2017/171505 A1 | | 10/2017 | |
| WO | WO 2018/084449 A2 | | 5/2018 | |
| WO | WO 2019/083193 A1 | | 5/2019 | |
| WO | WO 2019/083194 A1 | | 5/2019 | |

OTHER PUBLICATIONS

Extended European Search Report for European Application No. 20801821.8, dated Jun. 18, 2021.
International Search Report for PCT/KR2020/005614 (PCT/ISA/210) dated Aug. 5, 2020.
Li et al., "Self-Assembly of Polyethylene Glycol-Grafted Carbon Nanotube/Sulfur Composite with Nest-like Structure for High-Performance Lithium-Sulfur Batteries", ACS Applied Materials & Interfaces, 2016 American Chemical Society, 8, pp. 6061-6071.
Wang et al., "Enhanced rate capability and cycle stability of lithium-sulfur batteries with a bifunctional MCNT@PEG-modified separator", Journal of Materials Chemistry A, The Royal Society of Chemistry 2015, 3, pp. 7139-7144.

* cited by examiner

SEPARATOR INCLUDING POLYETHYLENE OXIDE-CONDUCTIVE CARBON COMPOSITE LAYER ON BASE SEPARATOR, METHOD FOR MANUFACTURING THE SAME, AND LITHIUM SECONDARY BATTERY COMPRISING THE SAME

TECHNICAL FIELD

The present application claims the benefits of priorities based on Korean Patent Application No. 10-2019-0052308 filed on May 3, 2019 and Korean Patent Application No. 10-2020-0049795 filed on Apr. 24, 2020, the entire contents of which are incorporated herein by reference.

The present invention relates to a functional separator, a method for manufacturing the same, and a lithium secondary battery comprising the same, more particularly, to a functional separator capable of improving the capacity and lifetime of the battery by coating a material capable of reducing the lithium polysulfide on the surface of the separator to solve the problem caused by the leaching of lithium polysulfide, a method for manufacturing the same and a lithium secondary battery comprising the same.

BACKGROUND ART

As interest in energy storage technology continues to increase, since its application is expanding from energy for mobile phones, tablets, laptops, and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur battery capable of being charged/discharged has become a focus of attention. In recent years, in developing these batteries, in order to improve capacity density and specific energy, it has led to research and development in designs for new electrodes and batteries.

Among these electrochemical devices, a lithium-sulfur battery (Li—S battery) has a high energy density (theoretical capacity) and thus is in the spotlight as a next-generation secondary battery that can replace a lithium-ion battery. In such a lithium-sulfur battery, a reduction reaction of sulfur and an oxidation reaction of lithium metal occur during discharge. At this time, sulfur forms lithium polysulfide (LiPS) having a linear structure from $S_8$ having a ring structure. This lithium-sulfur battery is characterized by showing a stepwise discharging voltage until the polysulfide is completely reduced to $Li_2S$.

However, the biggest obstacle of the lithium-sulfur battery in the commercialization is the leaching and shuttle phenomenon of the lithium polysulfide, which causes a big problem that the capacity of the lithium-sulfur battery is reduced. That is, since polysulfide leached from the positive electrode has high solubility in the organic electrolyte solution, undesired polysulfide migration (PS shuttling) to the negative electrode through the electrolyte solution may occur. As a result, a decrease in capacity due to irreversible loss of the positive electrode active material and a decrease in the lifetime of the battery by deposition of sulfur particles on the surface of the lithium metal due to side reactions occur. In order to solve these problems, various studies such as adding PS adsorbent to the positive electrode composite or modifying the separator made of existing PE, etc. are being conducted, but it is a real state that no clear solution has been suggested.

DISCLOSURE

Technical Problem

Therefore, in order to solve the problems caused by the leaching of the lithium polysulfide, it is an object of the present invention to provide a functional separator, a method for manufacturing the same, and a lithium secondary battery including the same, which can improve the capacity and lifetime of the battery by forming a coating layer, in which an electrically conductive carbon capable of reducing lithium polysulfide and polyethylene oxide for maximum efficiency are chemically bonded, on the surface of the separator.

Technical Solution

In order to achieve the above object, the present invention provides a functional separator comprising a base separator; and a polyethylene oxide (PEO)-conductive carbon composite layer located on the surface of the base separator.

In addition, the present invention provides a method for manufacturing a functional separator comprising the steps of (a) modifying the terminal of polyethylene oxide; (b) preparing a PEO-conductive carbon composite by chemically bonding the terminal functional group of the modified and formed polyethylene oxide with a conductive carbon; and (c) coating the prepared PEO-conductive carbon composite on the surface of the base separator.

In addition, the present invention provides a lithium secondary battery comprising a positive electrode, a negative electrode, a functional separator interposed between the positive electrode and the negative electrode, and an electrolyte.

Advantageous Effects

The functional separator, a method for manufacturing the same, and a lithium secondary battery comprising the same according to the present invention have an advantage of improving the capacity and lifetime of the battery by forming a coating layer, in which an electrically conductive carbon capable of reducing lithium polysulfide and polyethylene oxide for maximum efficiency are chemically bonded, on the surface of the separator, in order to solve the problems caused by the leaching of the lithium polysulfide.

BEST MODE

Hereinafter, the present invention will be described in detail.

The functional separator according to the present invention comprises a base separator and a polyethylene oxide (PEO)-conductive carbon composite layer present on the surface of the base separator.

The separator is interposed between the positive electrode and the negative electrode (that is, a physical separator having a function of physically separating the electrodes), and enables the transport of lithium ions between the positive electrode and the negative electrode, while separating or insulating the positive electrode and the negative electrode from each other. In particular, the separator is preferred as it has a low resistance to ion migration of the electrolyte and an excellent electrolyte impregnation ability, and the separator can be made of a porous, non-conductive or insulating material.

The base separator in which the PEO-conductive carbon composite layer is excluded may be an independent member such as a film or a coating layer added (adhered or faced) to any one or more of positive and negative electrodes. Specifically, as a base separator, porous polymer films, for example, porous polymer films made of polyolefin-based polymers, such as an ethylene homopolymer, a propylene homopolymer, an ethylene/butene copolymer, an ethylene/hexene copolymer, and an ethylene/methacrylate copolymer may be used alone or may be stacked and used, or the base separator may be a conventional porous nonwoven fabric, for example, a non-woven fabric made of high melting point glass fiber or polyethylene terephthalate fiber, but is not limited thereto.

The conductive carbon constituting the PEO-conductive carbon composite layer is coated with polyethylene oxide (PEO) on the surface of the base separator, and the conductive carbon itself has a pore structure, so the electrolyte solution is free to enter and exit. In addition, the conductive carbon, as its name suggests, has conductivity and is a component that can reduce lithium polysulfide by transferring electrons by such a property.

The conductive carbons may be applied without particular limitation as long as they are conductive carbon materials capable of exhibiting the above effects. Among them, carbon nanotubes (CNT), graphene, and reduced graphene oxide (rGO) can be exemplified, and among these, the use of the reduced graphene oxide is preferable, and it is more preferable to use thermally exfoliated reduced graphene oxide (TErGO), which is advantageous in exfoliation due to thermal expansion and can thus coat thin and large areas, thereby exhibiting excellent performance.

The thermally exfoliated reduced graphene oxide (TErGO) may be formed by heat-treating graphene oxide to prepare a thermally expanded graphene oxide (or thermally exfoliated graphene oxide) and then reducing it. At this time, the heat treatment for the preparation of the thermally expanded graphene oxide may be performed by a known method or various modified methods thereof, and is not particularly limited in the present invention. For example, the heat treatment may be performed for 10 minutes to 3 hours in a temperature range of 300 to 900° C.

In particular, the thermally exfoliated reduced graphene oxide (TErGO) is one which is exfoliated, and may have a thickness of 0.5 to 40 nm, preferably 5 to 30 nm, more preferably 10 to 20 nm, and may have a plate shape or flake shape. In addition, the degree of thermal expansion of the thermally exfoliated reduced graphene oxide (TErGO) may vary from less than 100 $m^2/g$ to 900 $m^2/g$ in the range of BET, and the degree of reduction can be measured through XPS or EA. In addition, the general graphene oxide may have a mass ratio of carbon and oxygen of about 1:1, whereas the reduced graphene oxide may have a mass ratio of about 9:1.

In general, since the reduced graphene oxide before exfoliation has a thickness of about 50 to 500 nm and is easily detached when coated in the form of particles (even if it is not a separator), not only does it require the use of a binder, but also the coating density is low, so that the desired effect cannot be sufficiently obtained. However, according to the present invention, it is possible to uniformly and densely coat on the substrate by using thermally exfoliated reduced graphene oxide in the form of a plate or flake having a range of thickness through exfoliation.

On the other hand, a binder may be interposed between the base separator and the PEO-conductive carbon composite layer so that the PEO-conductive carbon composite layer can be more easily coated on the surface of the base separator. However, in the case of using the thermally exfoliated reduced graphene oxide (TErGO) among the conductive carbon, in particular, reduced graphene oxide (rGO), of the present invention, since the conductive carbon is made of a plate-like or flake-like structure, the conductive carbon layer can be free-standing without the binder and easily coated on the surface of the base separator.

In addition to the conductive carbon, polyethylene oxide (PEO) or polyethylene glycol constituting the PEO-conductive carbon composite layer is used to maximize the reduction efficiency of the lithium polysulfide, and due to its chemical bonding with the conductive carbon or its physical properties, it is possible to more smoothly transfer lithium ions, while improving the bonding force with the base separator.

More specifically, the polyethylene oxide is to form a chemical bond with the conductive carbon, may have a chain type, a branch type, or a radial type, and may be modified to introduce a specific functional group into the terminal. If a functional group is on a terminal of the polyethylene oxide, the functional group may be an amine group (—$NH_2$) and a carboxy group (—COOH). For example, if an amine group is on a terminal of the polyethylene oxide, an amide bond may be formed with the carboxy group of the conductive carbon. If a carboxy group is on a terminal of the polyethylene oxide, an ester bond may be formed with a hydroxy group (—OH) or carboxy group of the conductive carbon, or anhydride may be formed by a dehydration condensation reaction. In addition, if a functional group is not on a polyethylene oxide, the hydroxy group of the polyethylene oxide itself and the carboxy group of the conductive carbon may be bonded to form an ester bond.

Meanwhile, the polyethylene oxide having a functional group introduced into the terminal may have a structure of a polyethylene oxide-linker-functional group. Examples of the case where the functional group is an amine group may comprise polyethylene oxide-carbonyl-ethylenediamine, ethylenediamine-carbonyl-polyethylene oxide-carbonyl-ethylenediamine, and the like.

In the PEO-conductive carbon composite layer, the weight ratio of the conductive carbon to the polyethylene oxide may be 1:0.01 to 100, preferably 1:0.08 to 0.6, more preferably 1:0.1 to 0.5. If the weight ratio is outside the weight ratio described above, the effects obtained by using polyethylene oxide may be insignificant. In addition, the number average molecular weight (Mn) of the polyethylene oxide may be 200 to 10,000,000, preferably 500 to 50,000.

The PEO-conductive carbon composite layer may be formed on a part of the surface of the base separator, but in order to maximize the effect of the use of conductive carbon and polyethylene oxide, it is preferable to form the entire surface of the base separator. The PEO-conductive carbon composite layer has a thickness of 0.1 to 15 μm, preferably 0.5 to 10 μm, more preferably 0.5 to 5 μm. If the thickness of the PEO-conductive carbon composite layer is less than 0.1 μm, since the conductive network is not sufficiently formed, there is a problem that electronic conductivity is lowered. If the thickness of the PEO-conductive carbon composite layer exceeds 15 μm, there is a concern that the passage of lithium ions is hindered, the cell resistance is increased, and an adverse problem occurs in terms of energy density per volume.

In addition, the coating weight of the PEO-conductive carbon composite layer is 1 to 300 μg/cm$^2$, preferably 3 to 80 μg/cm$^2$, more preferably 5 to 80 μg/cm$^2$, based on the surface area of the base separator to be coated. If the coating weight of the PEO-conductive carbon composite layer is less than 1 μg/cm$^2$ based on the surface area of the base separator, the effect arising from the use of conductive carbon and polyethylene oxide may be insignificant. If the coating weight of the PEO-conductive carbon composite layer exceeds 300 μg/cm$^2$, there may be no additional effect obtained by using conductive carbon and polyethylene oxide.

Next, a method of manufacturing a functional separator according to the present invention will be described. The method of manufacturing a functional separator comprises (a) modifying the terminal of polyethylene oxide, (b) preparing a PEO-conductive carbon composite by chemically bonding the terminal functional group of the modified polyethylene oxide with conductive carbon to form a polyethylene oxide-conductive carbon composite, and (c) coating the prepared PEO-conductive carbon composite on the surface of the base separator.

In step (a), the method of modifying the terminal of polyethylene oxide (specifically, modifying with a specific functional group) may be general modification methods for introducing a specific functional group into the terminal of the compound, for example, reacting an amine-based compound containing two or more amine groups such as ethylenediamine with polyethylene oxide in a solvent.

Examples of the solvent may comprise water, and organic solvents such as ethanol, acetone, IPA, THF, MC, DMF, DMSO, and DMAc. Among them, it may be desirable to apply THF or a compound having similar properties as a solvent. In addition, the reaction in step (a) can be carried out for 1 to 24 hours at room temperature to 100° C., preferably 40 to 70° C.

Step (b) is a process for preparing a PEO-conductive carbon composite by chemically bonding the hydroxyl or carboxy group of the conductive carbon to the terminal functional group of the polyethylene oxide modified and introduced or formed in step (a). The chemical bond may be achieved through a reaction under high temperature. The reaction can be carried out, for example, at a temperature of 70 to 150° C., preferably at a temperature of 80 to 120° C., more preferably at a temperature of about 100° C., for 8 to 48 hours, preferably 15 to 30 hours.

Through the chemical bonding of the functional group of polyethylene oxide and the hydroxy group or carboxy group of the conductive carbon formed by the above-described reaction, the bonding force between the conductive carbon and polyethylene oxide, as well as the bonding force between the conductive carbon and polyethylene oxide containing PEO-conductive carbon composite and the base separator are excellent, and it is possible to obtain the advantage of smooth delivery of lithium ions.

As described above, after the PEO-conductive carbon composite in which conductive carbon and polyethylene oxide are chemically bonded is prepared, a functional separator according to the present invention is prepared by coating the surface of the base separator with the PEO-conductive carbon composite. At this time, the coating may be performed by a drop-cast method, a dip-coating method, a blade coating method, a spray coating method, a Meyer bar coating method, or a vacuum filter.

Lastly, a lithium secondary battery comprising the functional separator provided by the present invention will be described. The lithium secondary battery comprising the functional separator comprises a positive electrode, a negative electrode, the functional separator interposed between the positive electrode and the negative electrode, and an electrolyte, and can be exemplified as any lithium secondary battery known in the art, such as a lithium-sulfur battery, a lithium air battery, and a lithium metal battery, and is preferably a lithium-sulfur battery. The description of the functional separator comprised in the lithium secondary battery is as described above. In addition, the positive electrode, the negative electrode, and the electrolyte applied to the lithium secondary battery may be common ones used in the art, and detailed description thereof will be described later.

Meanwhile, the present invention can also provide a battery module comprising the lithium secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system.

Hereinafter, a description of the positive electrode, the negative electrode, and the electrolyte applied to the lithium secondary battery according to the present invention is added.

Positive Electrode

The positive electrode used in the present invention will be described below. After preparing a composition for the positive electrode containing the positive electrode active material, the electrically conductive material, and the binder, the slurry prepared by diluting such a composition in a predetermined solvent (disperse medium) can be directly coated and dried on a positive electrode current collector to form a positive electrode layer. Alternatively, after casting the slurry on a separate support, a film obtained by peeling from the support can be laminated on a positive electrode current collector to produce a positive electrode layer. In addition, the positive electrode can be manufactured in a variety of ways using methods well known to those skilled in the art.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or DENKA BLACK (Denka Singapore Private Limited), products from Gulf Oil Company, KETJEN BLACK, EC series of products from Armak Company, products of VULCAN XC-72 from Cabot Company, and SUPER P (products from Timcal Company).

The electrically conductive material is not particularly limited as long as it as electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride: metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or Denka black (Denka Singapore Private Limited), products from Gulf Oil Company, Ketjen black, EC series of products from Armak Company, products of Vulcan XC-72 from Cabot Company, and Super P (products from Timcal Company).

The binder is for attaching the positive electrode active material to the current collector well. The binder should be well dissolved in the solvent, and should not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders, and mixtures or copolymers of two or more thereof.

The content of the binder may be, but is not limited to, 0.5 to 30 wt. % based on the total weight of the composition for the positive electrode. If the content of the binder resin is less than 0.5 wt. %, the physical properties of the positive electrode may be deteriorated and thus positive electrode active material and the electrically conductive material can be broken away. If the content exceeds 30 wt. %, the ratio of the active material and the electrically conductive material in the positive electrode is relatively reduced and thus the battery capacity may be reduced, and the efficiency may be reduced by acting as a resistive element.

The composition for the positive electrode comprising the positive electrode active material, the electrically conductive material, and the binder may be diluted in a predetermined solvent and coated on a positive electrode current collector using a conventional method known in the art. First, a positive electrode current collector is prepared. The positive electrode current collector generally has a thickness of 3 to 500 µm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector can also increase the adhesive force of the positive electrode active material by forming fine irregularities on its surface and can be in various forms such as film, sheet, foil, net, porous body, foam, and non-woven fabric.

Next, a slurry obtained by diluting the composition for the positive electrode containing the positive electrode active material, the electrically conductive material, and the binder in a solvent is applied on the positive electrode current collector. The composition for the positive electrode containing the above-described positive electrode active material, electrically conductive material, and binder may be mixed with a predetermined solvent to prepare the slurry. At this time, the solvent should be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol, and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film, and adhesion between the coating film and the current collector are achieved through a drying process. At this time, drying is performed according to a conventional method, and is not particularly limited.

Negative Electrode

As the negative electrode, any one capable of intercalation and deintercalation of lithium ions can be used. For example, metal materials such as lithium metal and lithium alloy, and carbon materials such as low crystalline carbon and high crystalline carbon can be exemplified. As the low crystalline carbon, soft carbon and hard carbon are typical. As the high crystalline carbon, high temperature sintered carbon such as natural graphite, Kish graphite, pyrolytic carbon, mesophase pitch based carbon fiber, meso-carbon microbeads, mesophase pitches, and petroleum or coal tar pitch derived cokes are typical. In addition, alloy series containing silicon, oxides such as $Li_4Ti_5O_{12}$ or the like are also well-known negative electrodes.

In this case, the negative electrode may comprise a binder. The binder may be various kinds of binder polymers such as polyvinylidenefluoride (PVDF), polyvinylidenefluoride-hexafluoropropylene copolymer (PVDF-co-HFP), polyacrylonitrile, polymethylmethacrylate, and styrene-butadiene rubber (SBR).

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as an alloy. In addition, a sintered carbon, a nonconductive polymer surface-treated with a conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Electrolyte

The electrolyte solution comprises solvents and lithium salt, and if necessary, may further contain additives. The solvent can be used without particular limitation, as long as it is a conventional non-aqueous solvent that serves as a medium through which ions involved in the electrochemical reaction of the battery can move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, and mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether, etc. In addition, examples of the ketone-based solvent may comprise cyclohexanone, etc. Examples of the alcohol-based solvent may comprise ethylalcohol, isopropylalcohol, etc. Examples of the aprotic solvent may comprise nitriles such as acetonitrile, amides such as dimethylformamide, dioxolanes such as 1,3-dioxolane (DOL), sulfolane, etc. The non-aqueous organic solvents may be used alone or in combination of two or more. The mixing ratio when using in combination of two or more may be appropriately adjusted depending on the desired performance of the battery, and a solvent in which 1,3-dioxolane and dimethoxyethane are mixed in a volume ratio of 1:1 can be exemplified.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

[Example 1] Preparation of Functional Separator

First, through the reaction of Reaction Scheme 1 using a solvent (THF) and ethylenediamine, both terminals of polyethylene oxide were modified with amine groups:

[Reaction Scheme 1]

In addition, after the graphene oxide (SE2430, Sixth Element, China) was reduced by heat treatment at 300° C. for 1 hour, a thermally exfoliated reduced graphene oxide having a thickness of 15 nm was prepared using a high-speed mixer and an ultrasonic homogenizer.

Subsequently, the prepared thermally exfoliated reduced graphene oxide and 10 parts by weight of polyethylene oxide (having amine groups formed in both terminals) relative to 100 parts by weight of thermally exfoliated reduced graphene oxide were reacted at 100° C. for 24 hours to prepare a PEO-conducting carbon composite in which the amine group of polyethylene oxide and the carboxy group of TErGO were chemically bonded.

Subsequently, the porous base separator made of polyethylene is coated with the prepared PEO-conductive carbon composite by a vacuum filtration method and then dried to manufacture a functional separator having a weight of the coating layer (PEO-conductive carbon composite layer) of 6 μg/cm$^2$ based on the surface area of the base separator and a thickness of 4 μm.

[Example 2] Manufacture of Functional Separator

A functional separator was manufactured in the same manner as in Example 1, except that the weight of the coating layer (PEO-conductive carbon composite layer) was changed to be 22 μg/cm$^2$ based on the surface area of the base separator and the thickness was changed to be 6 μm.

[Example 3] Manufacture of Functional Separator

A functional separator was manufactured in the same manner as in Example 1, except that the weight of the coating layer (PEO-conductive carbon composite layer) was changed to be 74 μg/cm$^2$ based on the surface area of the base separator and the thickness was changed to be 10 μm.

[Example 4] Manufacture of Functional Separator

A functional separator was manufactured in the same manner as in Example 1, except that the content of polyethylene oxide having amine groups formed in both terminals was changed to be 50 parts by weight relative to 100 parts by weight of TErGO and the weight of the coating layer (PEO-conductive carbon composite layer) was changed to be 16 μg/cm$^2$ based on the surface area of the base separator.

[Example 5] Manufacture of Functional Separator

A functional separator was manufactured in the same manner as in Example 1, except that the content of polyethylene oxide having amine groups formed in both terminals was changed to be 50 parts by weight relative to 100 parts by weight of TErGO, the weight of the coating layer (PEO-conductive carbon composite layer) was changed to be 23 µg/cm² based on the surface area of the base separator, and the thickness was changed to be 6 µm.

[Example 6] Manufacture of Functional Separator

A functional separator was manufactured in the same manner as in Example 1, except that the content of polyethylene oxide having amine groups formed in both terminals was changed to be 50 parts by weight relative to 100 parts by weight of TErGO, the weight of the coating layer (PEO-conductive carbon composite layer) was changed to be 64 µg/cm² based on the surface area of the base separator, and the thickness was changed to be 10 µm.

[Comparative Example 1] Conventional Separator

A bare separator made of polyethylene (PE) without a separate coating was manufactured.

[Comparative Example 2] Manufacture of Conventional Separator

Only the thermally exfoliated reduced graphene oxide (TErGO) which is a conductive carbon was coated on a porous base separator made of polyethylene by vacuum filtration and then dried to manufacture a separator having the weight of the coating layer of 6 µg/cm² based on the surface area of the base separator and the thickness of 4 µm.

[Comparative Example 3] Manufacture of Conventional Separator

A separator was prepared in the same manner as in Example 1, except that polyethylene imine instead of polyethylene oxide having amine groups formed on both terminals was used.

[Examples 1 to 6, Comparative Examples 1 to 3] Manufacture of Lithium-Sulfur Battery A lithium-sulfur battery comprising separators prepared in Examples 1 to 6 or Comparative Examples 1 to 3, 70 µl of electrolyte solution (DOL:DME (1:1 (vol)), 1.0 M LiTFSI, 1 wt. % LiNO₃), and a sulfur positive electrode and a lithium metal negative electrode was manufactured.

Figure 1:
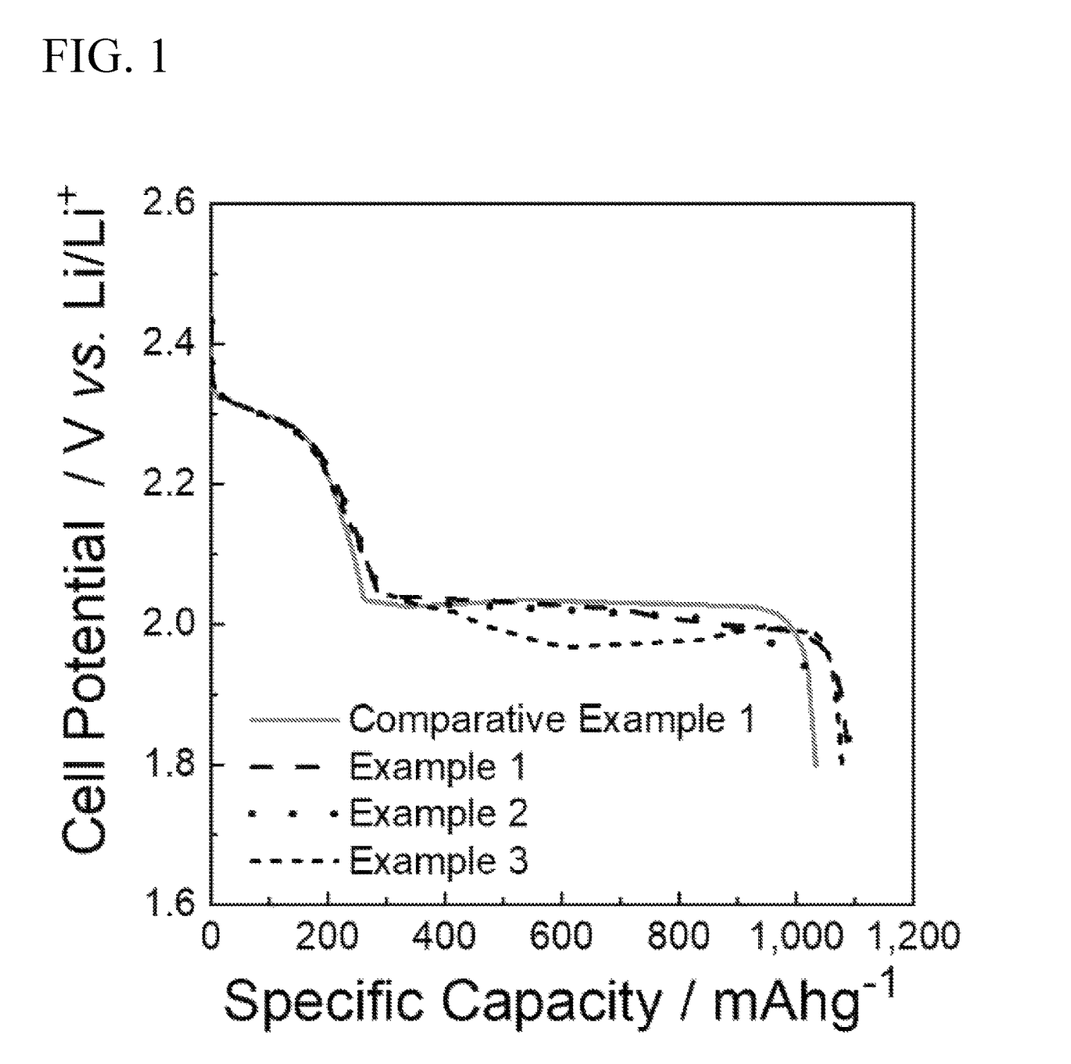
FIGS. 1 to 3 are graphs comparing the discharging capacities of lithium-sulfur batteries according to the examples of the present invention and comparative examples.
Figure 2:
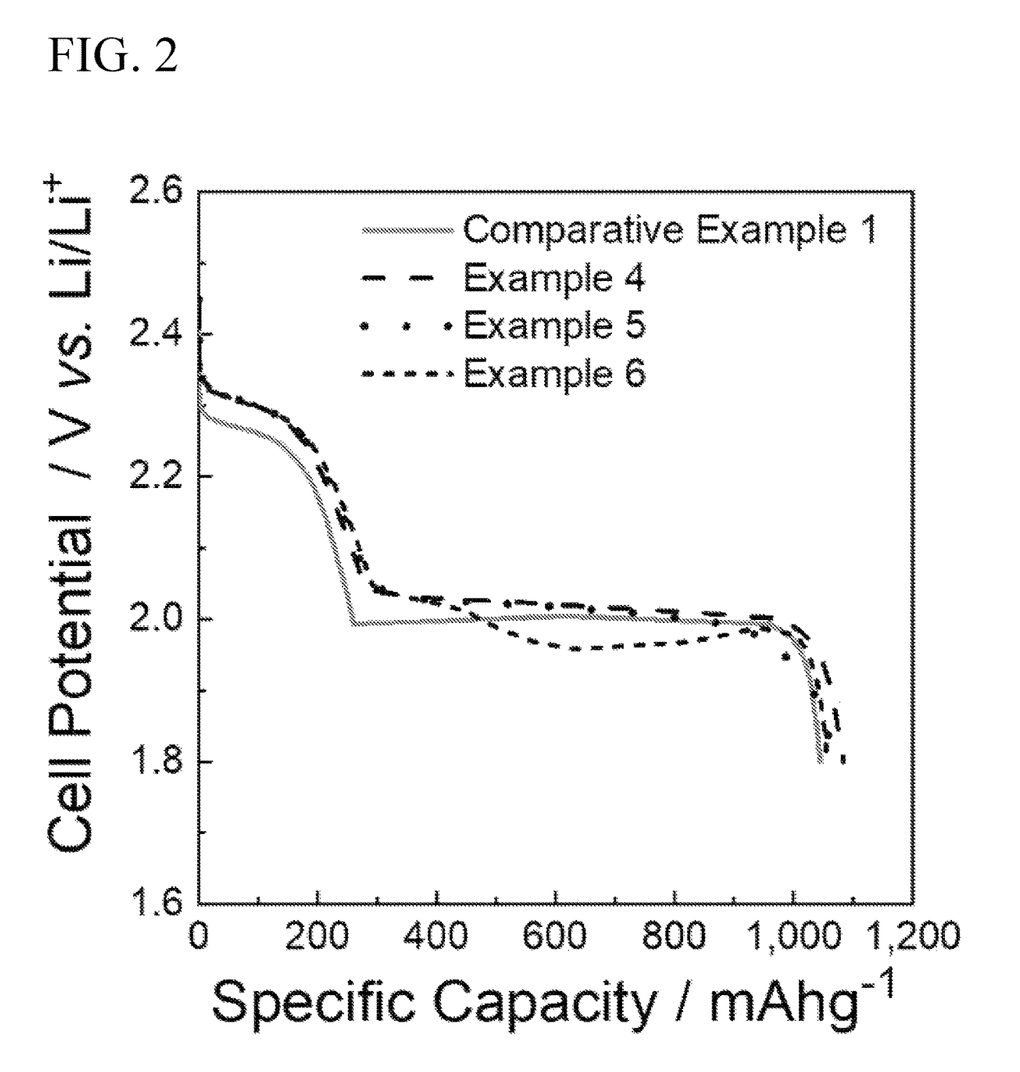
Figure 3:
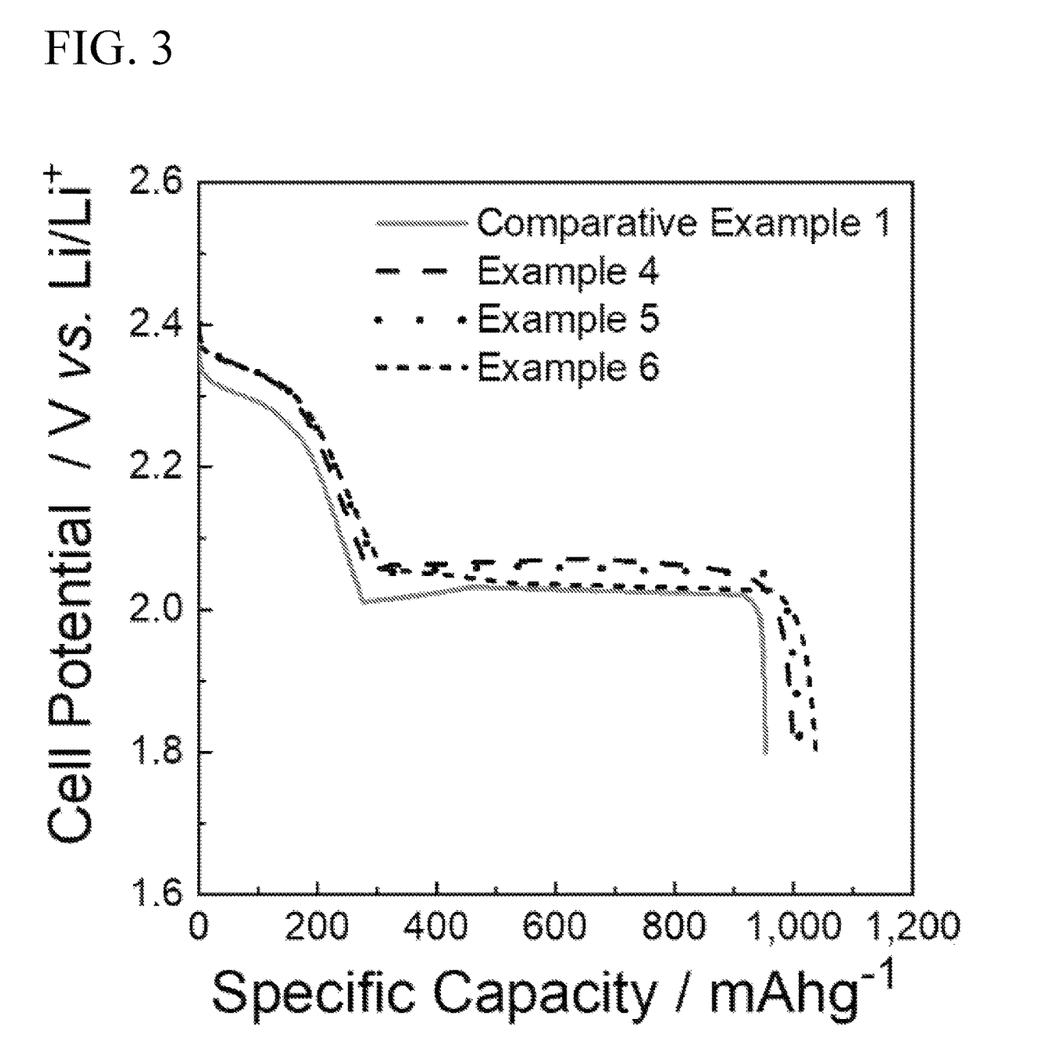
Figure 4:
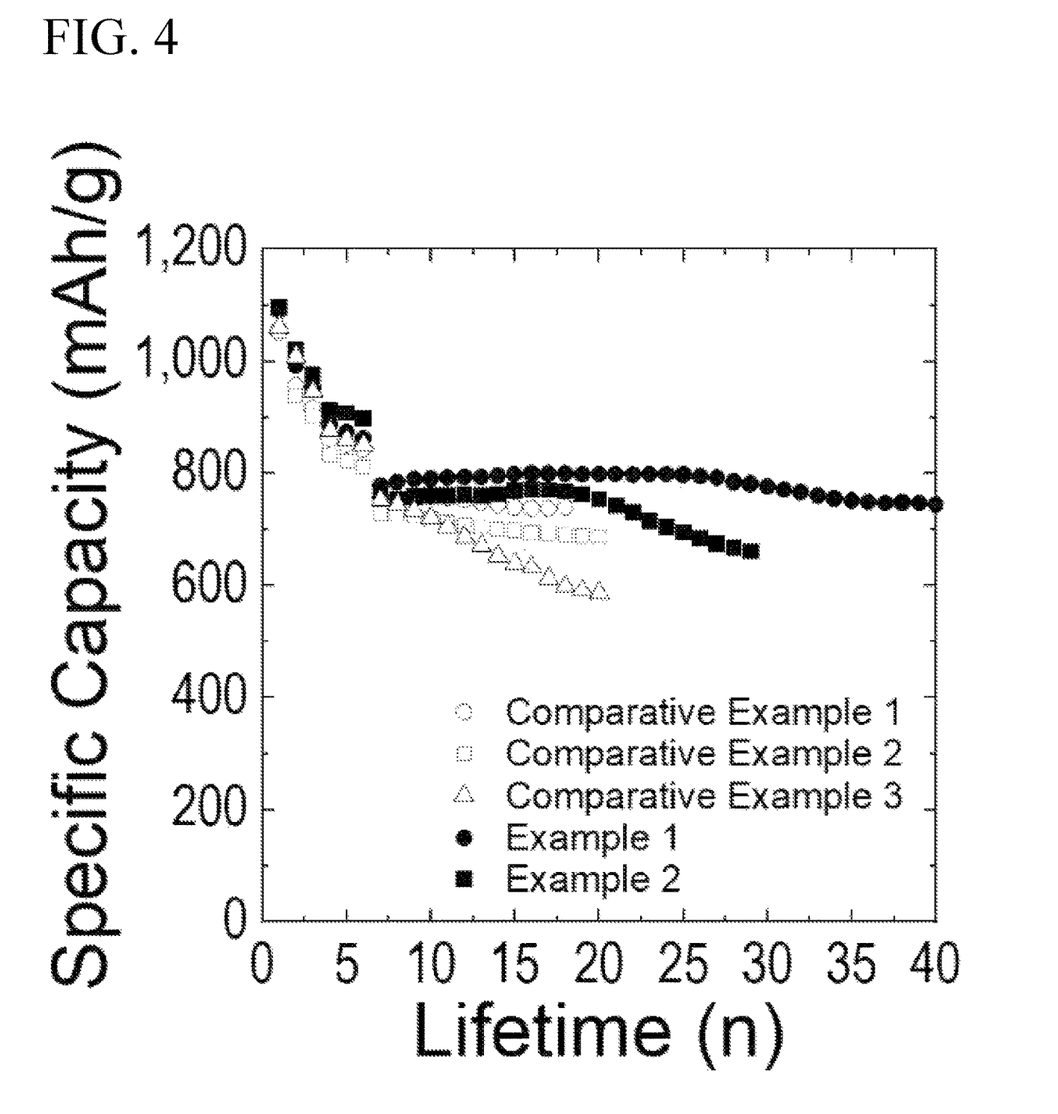
FIG. 4 is a graph comparing the lifetime characteristics of lithium-sulfur batteries according to the examples of the present invention and comparative examples.

[Experimental Example 1] Evaluation of Discharging Capacity and Lifetime Characteristics of Lithium-Sulfur Battery After the discharging current rate was set to 0.1 C (three times), 0.2 C (three times), and then 0.5 C, the discharging capacity and lifetime characteristics of the manufactured lithium-sulfur battery were observed. FIGS. 1 to 3 are graphs comparing discharging capacities of lithium-sulfur batteries according to the examples of the present invention and comparative examples, and FIG. 4 is a graph comparing the lifetime characteristics of lithium-sulfur batteries according to the examples of the present invention and comparative examples.

As a result of evaluating the initial discharging capacities of the prepared lithium-sulfur batteries, it was confirmed that in the case of the batteries of Examples 1 to 3 in which the PEO-conductive carbon composite was applied as the coating layer of the base separator, the discharging amount is higher as compared to the battery of Comparative Example 1 which had no coating on the base separator, as shown in FIG. 1.

In addition, it was confirmed that in the case of the batteries of Examples 4 to 6 in which the PEO-conductive carbon composite was applied as the coating layer of the base separator, the overvoltage is improved and the discharging amount is also slightly increased as compared to the battery of Comparative Example 1 which had no coating on the base separator, as shown in FIG. 2.

In addition, it was confirmed that as a result of evaluating the discharge capacity after the initial stage of the prepared lithium-sulfur battery, the batteries of Examples 4 to 6, in which the PEO-conductive carbon composite was applied as a coating layer of the base separator, have an improved overvoltage and a significantly increased discharging amount as compared to the battery of Comparative Example 1 without any coating on the base separator, as shown in FIG. 3.

Meanwhile, as a result of evaluating the lifetime characteristics of the manufactured lithium-sulfur batteries, it was confirmed that in the case of the batteries of Examples 1 and 2 in which the PEO-conductive carbon composite was applied as the coating layer of the base separator, the lifetimes are increased as compared to the battery of Comparative Example 1 which had no coating on the base separator, the battery of Comparative Example 2 in which only the thermally exfoliated reduced graphene oxide (TErGO) was coated on the base separator, and the battery of Comparative Example 3 using polyethylene imine instead of modified polyethylene oxide, as shown in FIG. 4.

The invention claimed is:

1. A functional separator comprising:
a base separator; and
a polyethylene oxide-conductive carbon composite layer present on a surface of the base separator,
wherein the conductive carbon is thermally exfoliated reduced graphene oxide having a mass ratio of carbon and oxygen of about 9:1, and
wherein a coating weight of the polyethylene oxide-conductive carbon composite layer is 6 µg/cm² to 74 µg/cm² based on a surface area of the base separator.

2. The functional separator according to claim 1, wherein the polyethylene oxide comprises a hydroxy group, wherein the conductive carbon comprises a carboxy group, and wherein the hydroxy group of the polyethylene oxide and the carboxy group of the conductive carbon are ester-bonded.

3. The functional separator according to claim 1, wherein a weight ratio of the conductive carbon to the polyethylene oxide present in the polyethylene oxide-conductive carbon composite layer is 1:0.01 to 100.

4. The functional separator according to claim 1, wherein a thickness of the polyethylene oxide-conductive carbon composite layer is 0.1 µm to 15 µm.

5. The functional separator according to claim 1, wherein the polyethylene oxide is modified with a functional group on a terminal of the polyethylene oxide.

6. The functional separator according to claim 5, wherein the polyethylene oxide having an amine group on a terminal of the polyethylene oxide has a structure of a polyethylene oxide-linker-amine group.

7. The functional separator according to claim 6, wherein the polyethylene oxide having an amine group on a terminal of the polyethylene oxide is polyethylene oxide-carbonylethylenediamine or ethylenediamine-carbonyl-polyethylene oxide-carbonyl-ethylenediamine.

8. The functional separator according to claim 5,
wherein the conductive carbon comprises at least one of a hydroxy group and a carboxy group, and
wherein the functional group is chemically bonded to the hydroxy group or the carboxy group of the conductive carbon.

9. The functional separator according to claim 8, wherein the functional group is an amine group or a carboxy group.

10. The functional separator according to claim 9, wherein the functional group is an amine group, and the functional group is amide-bonded with the carboxy group of the conductive carbon.

11. The functional separator according to claim 9, wherein the functional group is a carboxy group, and the functional group is ester-bonded or the functional group undergoes dehydration condensation reaction with the hydroxy group or the carboxy group of the conductive carbon to form an anhydride.

12. A lithium secondary battery comprising:
a positive electrode;
a negative electrode;
the functional separator of claim 1 interposed between the positive electrode and the negative electrode; and
an electrolyte.

13. The lithium secondary battery according to claim 12, wherein the lithium secondary battery is a lithium-sulfur battery.

14. A method for manufacturing a functional separator comprising the steps of:
(a) modifying a terminal of a polyethylene oxide;
(b) preparing a polyethylene oxide-conductive carbon composite by chemically bonding a terminal functional group of the modified polyethylene oxide with conductive carbon to form a polyethylene oxide-conductive carbon composite; and
(c) coating the prepared polyethylene oxide-conductive carbon composite on the surface of the base separator,
wherein the conductive carbon is thermally exfoliated reduced graphene oxide having a mass ratio of carbon and oxygen of about 9:1, and
wherein a coating weight of the polyethylene oxide-conductive carbon composite layer is 6 µg/cm$^2$ to 74 µg/cm$^2$ based on a surface area of the base separator.

15. The method for manufacturing the functional separator according to claim 14, wherein the terminal functional group of the polyethylene oxide in step (b) is chemically bonded to a hydroxy group or a carboxy group of the conductive carbon.

* * * * *